(12) United States Patent
Mahgerefteh et al.

(10) Patent No.: US 7,356,264 B2
(45) Date of Patent: Apr. 8, 2008

(54) CHIRP MANAGED LASER WITH ELECTRONIC PRE-DISTORTION

(75) Inventors: Daniel Mahgerefteh, Los Angeles, CA (US); Yasuhiro Matsui, Lawrence, MA (US); Parviz Tayebati, Weston, MA (US)

(73) Assignee: Azna LLC, Wilmington, MA (US)

( * ) Notice: Subject to any disclaimer, the term of this patent is extended or adjusted under 35 U.S.C. 154(b) by 440 days.

(21) Appl. No.: 11/016,466

(22) Filed: Dec. 17, 2004

(65) Prior Publication Data

US 2005/0169642 A1    Aug. 4, 2005

Related U.S. Application Data

(63) Continuation-in-part of application No. 10/289,944, filed on Nov. 6, 2002, now Pat. No. 6,963,685, and a continuation-in-part of application No. 10/933,081, filed on Sep. 2, 2004.

(60) Provisional application No. 60/530,479, filed on Dec. 17, 2003, provisional application No. 60/629,741, filed on Nov. 19, 2004.

(51) Int. Cl.
*H04B 10/04* (2006.01)

(52) U.S. Cl. ...................... 398/193; 398/201

(58) Field of Classification Search ........ 398/185–187, 398/193
See application file for complete search history.

(56) References Cited

U.S. PATENT DOCUMENTS

| | | | |
|---|---|---|---|
| 4,561,119 A | 12/1985 | Epworth | |
| 4,805,235 A | 2/1989 | Henmi | |
| 5,416,629 A | 5/1995 | Huber | |
| 5,920,416 A | 7/1999 | Beylat et al. | |
| 6,104,851 A | 8/2000 | Mahgerefteh | |

(Continued)

FOREIGN PATENT DOCUMENTS

GB    2107147 A    4/1983

OTHER PUBLICATIONS

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Leslie Pascal
(74) *Attorney, Agent, or Firm*—Pandiscio & Pandiscio

(57) ABSTRACT

A fiber optic transmitter comprising:
  a digital driver adapted to adjust the rise time and fall time of a digital input signal;
  an optical source adapted to receive the digital signal and produce a frequency modulated optical signal; and
  an optical spectrum reshaper adapted to convert the frequency modulated optical signal to an amplitude modulated optical signal.

A method for transmitting an optical signal through a fiber comprising:
  receiving a digital input signal;
  adjusting the rise time and fall time of the digital input signal so as to produce an adjusted digital input signal;
  passing the adjusted digital input signal to an optical source so as to produce a frequency modulated optical signal;
  passing the frequency modulated optical signal through an optical spectrum reshaper so as to convert the frequency modulated optical signal to an amplitude modulated optical signal; and
  passing the amplitude modulated signal into the fiber.

5 Claims, 3 Drawing Sheets
(2 of 3 Drawing Sheet(s) Filed in Color)

U.S. PATENT DOCUMENTS

| | | |
|---|---|---|
| 6,115,403 A | 9/2000 | Brenner et al. |
| 6,331,991 B1 | 12/2001 | Mahgerefteh |
| 6,563,623 B1 | 5/2003 | Penninckx et al. |
| 6,963,685 B2 | 11/2005 | Mahgerefteh et al. |
| 2004/0096221 A1 | 5/2004 | Mahgerefteh et al. |
| 2005/0111852 A1 | 5/2005 | Mahgerefteh et al. |
| 2006/0029396 A1 | 2/2006 | Mahgerefteh et al. |

OTHER PUBLICATIONS

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Shalom, H., et al., On the Various Time Constants of Wavelength Changes of a DFB Laser Under Direct Modulation, IEEE Journal of Quantum Electronics, Oct. 1998, 1816-1822, vol. 34, No. 10.

Little, B. E., Advances in MicroRing Resonators, LittleOptics, Inc., Integrated Photonics Research Conference 2003.

CHIRP MANAGED LASER WITH ELECTRONIC PRE-DISTORTION

REFERENCE TO PENDING PRIOR PATENT APPLICATIONS

This patent application is:

(i) a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) a continuation-in-part of pending prior U.S. patent application Ser. No. 10/933,081, filed Sep. 2, 2004 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER;

(iii) claims benefit of pending prior U.S. Provisional Patent Application Ser. No. 60/530,479, filed Dec. 17, 2003 by Daniel Mahgerefteh et al. for OPTICAL TELECOMMUNICATION SYSTEM; and (iv) claims benefit of pending prior U.S. Provisional Patent Application Ser. No. 60/629,741, filed Nov. 19, 2004 by Yasuhiro Matsui et al. for OPTICAL SYSTEM COMPRISING AN FM SOURCE AND A SPECTRAL RESHAPING ELEMENT.

The four above-identified patent applications are hereby incorporated herein by reference.

FIELD OF THE INVENTION

This invention relates to signal transmissions in general, and more particularly to the transmission of optical signals.

BACKGROUND OF THE INVENTION

In general, a primary function of a fiber optic transmitter is to convert an electrical digital input signal to an optical digital output signal, hence, the fiber optic transmitter is sometimes referred to as an electrical/optical converter. In common practice, the digital electrical data is amplified by a driver, which is adapted to modulate the optical transmitter. For an externally modulated transmitter, such as a Lithium Niobate transmitter, the driver typically modulates the amplitude of the signal by changing the refractive index of the transmitter material (e.g., Lithium Niobate), which acts as an electro-optical switch. For a transmitter based on a directly modulated laser, the driver typically modulates the bias current of a laser (e.g., a DFB laser).

A high quality transmitter must produce a high quality optical signal (i) at its output, and (ii) after propagation through dispersive fiber. The quality of the transmitter output is generally measured qualitatively in terms of a so-called "eye diagram", which is a clocked overlap of the amplitude of a random bit pattern in time, and quantitatively by the bit error rate.

A system for long-reach lightwave data transmission through optical fiber has been disclosed in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM, which patent application is hereby incorporated herein by reference. Azna LLC of Wilmington, Mass. sometimes refers to the transmitter apparatus of this patent application as a Chirp Managed Laser (CML™). In this system, a frequency modulated (FM) source is followed by an optical discriminator, also sometimes referred to as an optical spectrum reshaper (OSR), which converts frequency modulation into a substantially amplitude modulated (AM) signal and partially compensates for the dispersion in the transmission fiber. This is a directly modulated laser based transmitter, so that the driver modulates the current to the laser.

Also, in U.S. patent application Ser. No. 10/933,081, filed Sep. 2, 2004 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER, which patent application is hereby incorporated herein by reference, a system is disclosed for improving the optical eye quality and the bit error rate performance of the CML™ laser by using the laser driver to adjust the duty cycle of the input electrical signal.

An object of the present invention is to further improve the eye quality and the bit error rate of the CML™ system.

SUMMARY OF THE INVENTION

According to a preferred embodiment of the present invention, the electrical driver signal of the optical transmitter's laser is modified in order to improve the eye quality and the bit error rate of the optical signal at the output of the CML™ transmitter. In other words, the quality of the optical transmitter is improved by using appropriate electronic pre-distortion.

In one form of the invention, there is provided a fiber optic transmitter comprising:

a digital driver adapted to adjust the rise time and fall time of a digital input signal;

an optical source adapted to receive the digital signal and produce a frequency modulated optical signal; and an optical spectrum reshaper adapted to convert the frequency modulated optical signal to an amplitude modulated optical signal.

In another form of the invention, there is provided a method for transmitting an optical signal through a fiber comprising:

receiving a digital input signal;

adjusting the rise time and fall time of the digital input signal so as to produce an adjusted digital input signal;

passing the adjusted digital input signal to an optical source so as to produce a frequency modulated optical signal;

passing the frequency modulated optical signal through an optical spectrum reshaper so as to convert the frequency modulated optical signal to an amplitude modulated optical signal; and passing the amplitude modulated signal into the fiber.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

In a preferred embodiment of the present invention, the frequency modulated source is a directly modulated semiconductor laser, such as a distributed feedback laser (DFB). The laser is typically driven by digital electrical data having a non-return-to-zero (NRZ) pattern. The pattern of the digital electrical input data is characterized by a rise time and a fall time determined by (i) the data source, (ii) the RF characteristics of the driver, and (iii) the RF transmission line delivering the signal to the laser diode.

The rise and fall times of a conventional driver are typically about the same. For a typical 10 Gb/s driver, the rise time and fall times are ~20-30 ps, respectively. In a preferred embodiment of the present invention, the rise time of the driver signal is adapted to be longer than the fall time of the driver signal. Advantageously, appropriately engineered asymmetry of the driver signal's rise and fall times is used to improve the quality of the system's eye diagram and reduce the bit error rate after propagation through a dispersive fiber.

Figure 1:
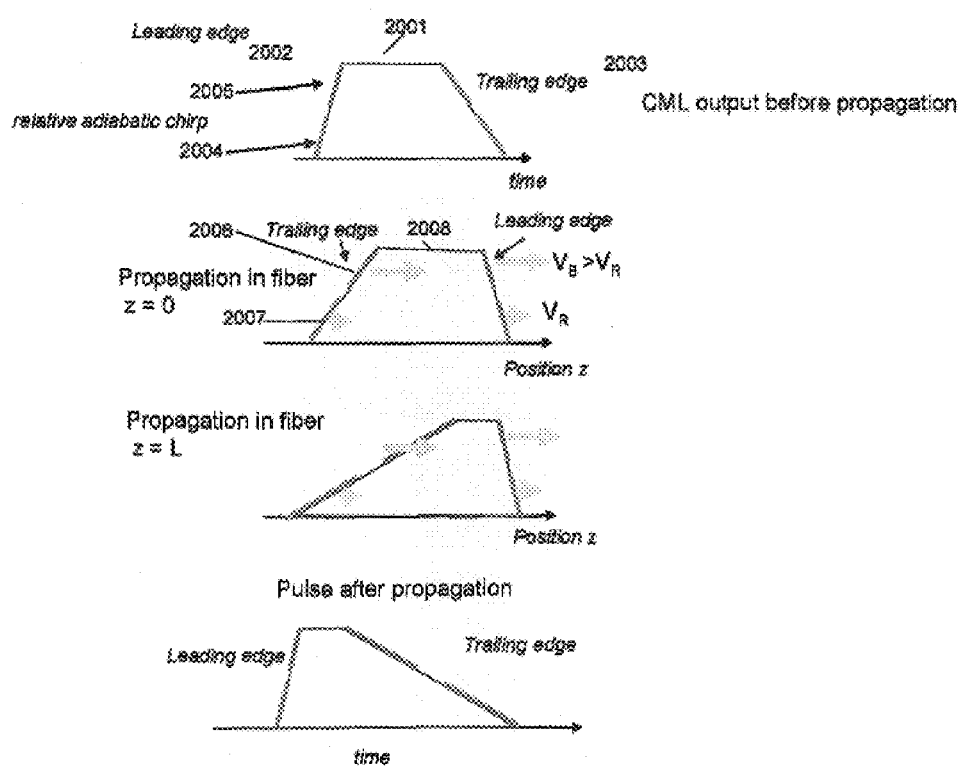
FIG. 1 is a schematic diagram of a frequency and amplitude modulated pulse which is assumed to have no transient chirp.

FIG. 1 shows a frequency and amplitude modulated pulse. In this figure, the amplitude profile is color-coded to illustrate the frequency modulation. The pulse is assumed to have no transient chirp; hence the top of the 1 bits (i.e., 1s) are blue-shifted in frequency relative to the bottom of the 0 bits (i.e., 0s). Here it is assumed that the extinction ratio is high, so that the energy in the 0s can be neglected. The main cause of distortion of this optical signal in dispersive fiber is the relative shift of the rising edges of the pulse 2002 and trailing edges of the pulse 2002 (i.e., the 1 to 0 and 0 to 1 transitions) upon propagation through dispersive fiber.

Upon propagation in fiber, the different frequency components travel at different speeds, thus causing the pulse to distort. In standard telecommunication fiber with positive dispersion, D~+17 ps/nm/km, the blue-shifted components 2005 travel faster than the red-shifted components 2004. On the leading edge, this causes the upper part of the edge 2005 to get ahead of the bottom part of the edge 2004, thereby causing that edge to compress. On the trailing edge, the top, blue-shifted part 2006 pushes towards the middle of the pulse while the bottom, red-shifted part 2007 moves out from the middle of the pulse 2008, causing the trailing edge to disperse out and thus broadening the pulse. Thus, after propagation through the fiber, the pulse becomes somewhat triangular, with a faster rise time and a slower fall time relative to the rise time (and a slower fall time relative to the fall time before fiber propagation). Hence the "eye" closes more on the trailing edge and opens more on the leading edge.

Nonlinear laser dynamics causes the rising edge of the output of a directly modulated laser (DML) to be faster than the falling edge of the output, even when the laser is driven with a digital signal of similar rise and fall times. This asymmetry increases the pulse distortion described above. It is, therefore, a further object of the present invention to reduce the pulse distortion in the output of a frequency modulated laser by adapting its driving condition.

In a preferred embodiment of the present invention, the quality of the optical transmitter is improved providing a driver that has appropriate rise and fall times, whereby to counteract pulse distortion. In particular, the driver is adapted to produce a modified optical pulse for the CML™ system, where that modified optical pulse has a longer rise time and a faster fall time.

Figure 2:
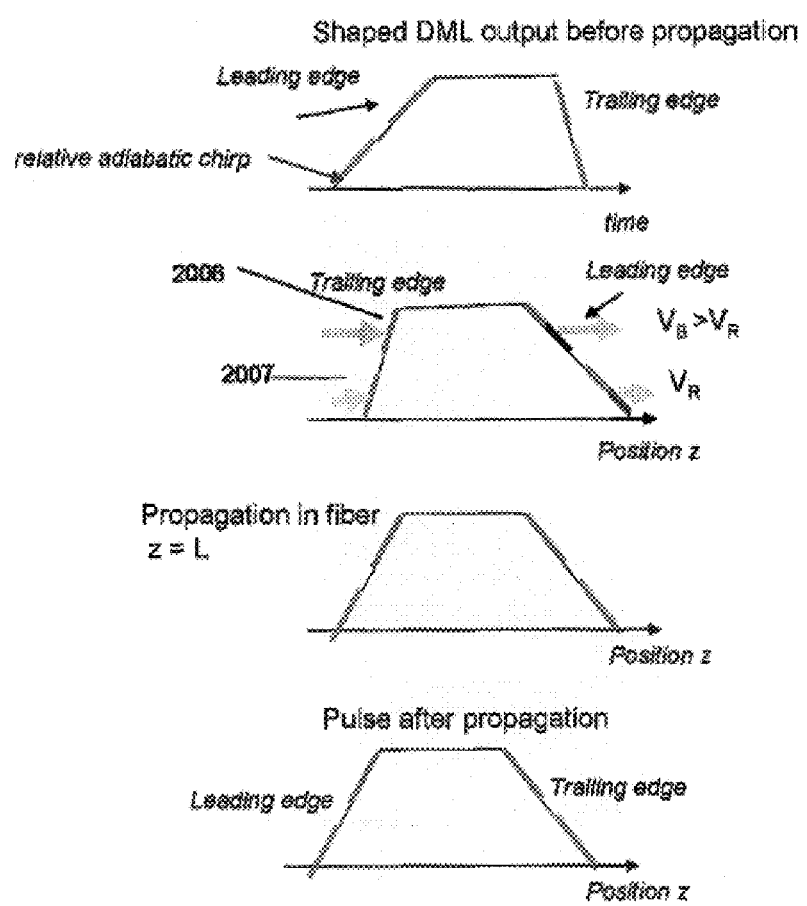
FIG. 2 is a schematic diagram of a frequency and amplitude modulated pulse having adiabatic chirp and a rise time which is slower than its fall time.

FIG. 2 shows the schematic of a frequency and amplitude modulated pulse having adiabatic chirp and a rise time which is slower than its fall time. With this arrangement, the leading edge is slower than the trailing edge. Upon propagation through fiber of positive dispersion, the top, blue-shifted part 2006 of the leading edge moves faster than the red-shifted bottom part 2007, and catches up with it, causing the leading edge to compress. On the trailing edge, the red-shifted bottom part moves away from the center of the pulse and expands the compressed trailing edge, thereby making the pulse more symmetric.

In a telecommunications system, which also comprises a receiver and a decision circuit after the fiber, the rise and fall times of the output of the transmitter can be adjusted so as to reduce the pulse distortion and therefore achieve a desired "dispersion penalty" (i.e., signal quality).

Figure 3:
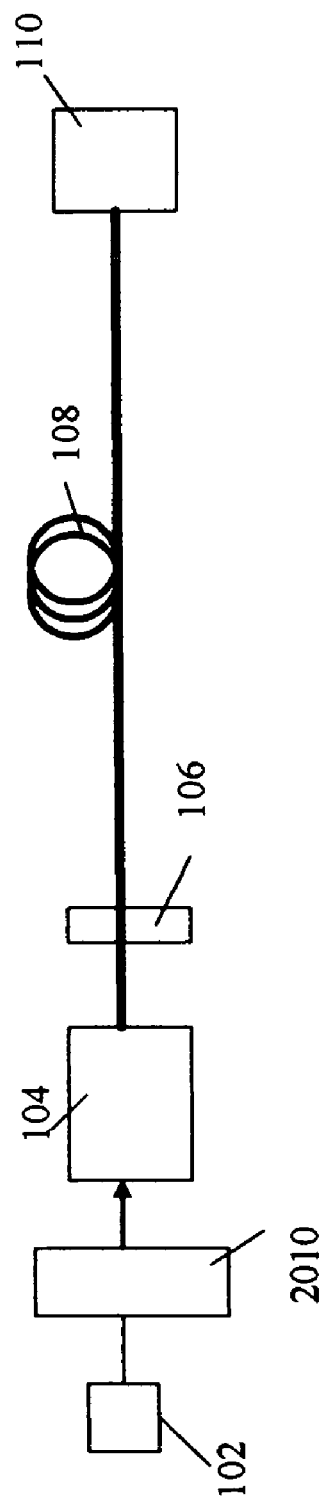
FIG. 3 is a schematic diagram of a system in which a digital signal is input to an electronic driver circuit, which is adapted to make the rise time longer than the fall time before it frequency modulates a source.

FIG. 3 shows a telecommunications system in which a digital signal 102 is input to an electronic driver circuit 2010, which is adapted to make the rise time longer than the fall time before it frequency modulates the source 104. An optical spectrum reshaper (OSR) 106 converts frequency modulation to amplitude modulation and couples the signal into a fiber 108. A receiver 110 at the end of the transmission fiber receives the signal.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic transmitter comprising:
   a digital driver adapted to adjust the rise time and fall time of a digital input signal;
   an optical source adapted to receive the digital signal and produce a frequency modulated optical signal; and
   an optical spectrum reshaper adapted to convert the frequency modulated optical signal to an amplitude modulated optical signal.

2. A fiber optic system according to claim 1 wherein the driver is adapted to produce a digital signal having a faster fall time than rise time.

3. A fiber optic system according to claim 1 wherein the rise time and fall time of the digital signal are adjusted so as to obtain the desired optical eye shape at the output of a transmission fiber.

4. A fiber optic system according to claim 1 wherein the rise time and fall time of the digital signal are adjusted so as to obtain the desired bit error rate at the output of a transmission fiber.

5. A method for transmitting an optical signal through a fiber comprising:
   receiving a digital input signal;
   adjusting the rise time and fall time of the digital input signal so as to produce an adjusted digital input signal;

passing the adjusted digital input signal to an optical source so as to produce a frequency modulated optical signal;

passing the frequency modulated optical signal through an optical spectrum reshaper so as to convert the frequency modulated optical signal to an amplitude modulated optical signal; and passing the amplitude modulated signal into the fiber.

* * * * *